Dec. 8, 1964   J. A. M. LECARME   3,160,367
AUTOMATIC AIRCRAFT RUDDER TRIMMER IN THE
EVENT OF FAILURE OF ONE TURBINE
ENGINE DRIVING SAID AIRCRAFT
Filed Dec. 31, 1962   4 Sheets-Sheet 3
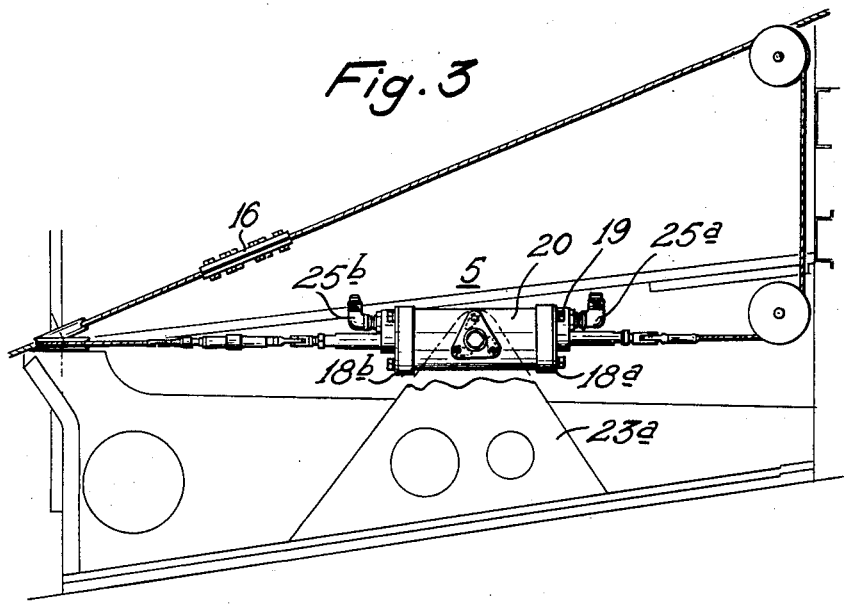
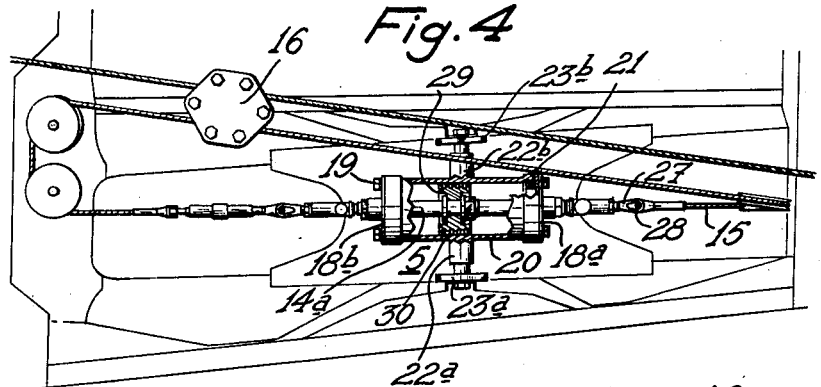
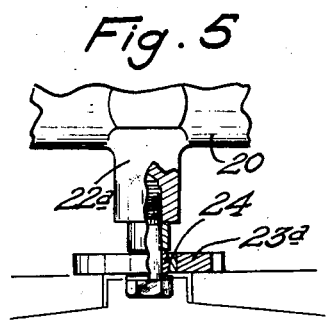
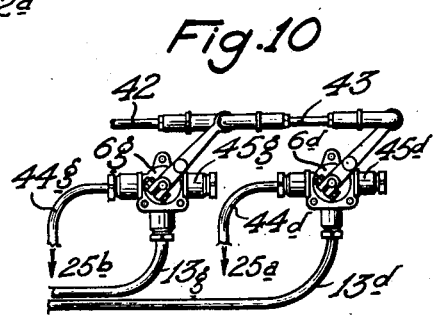

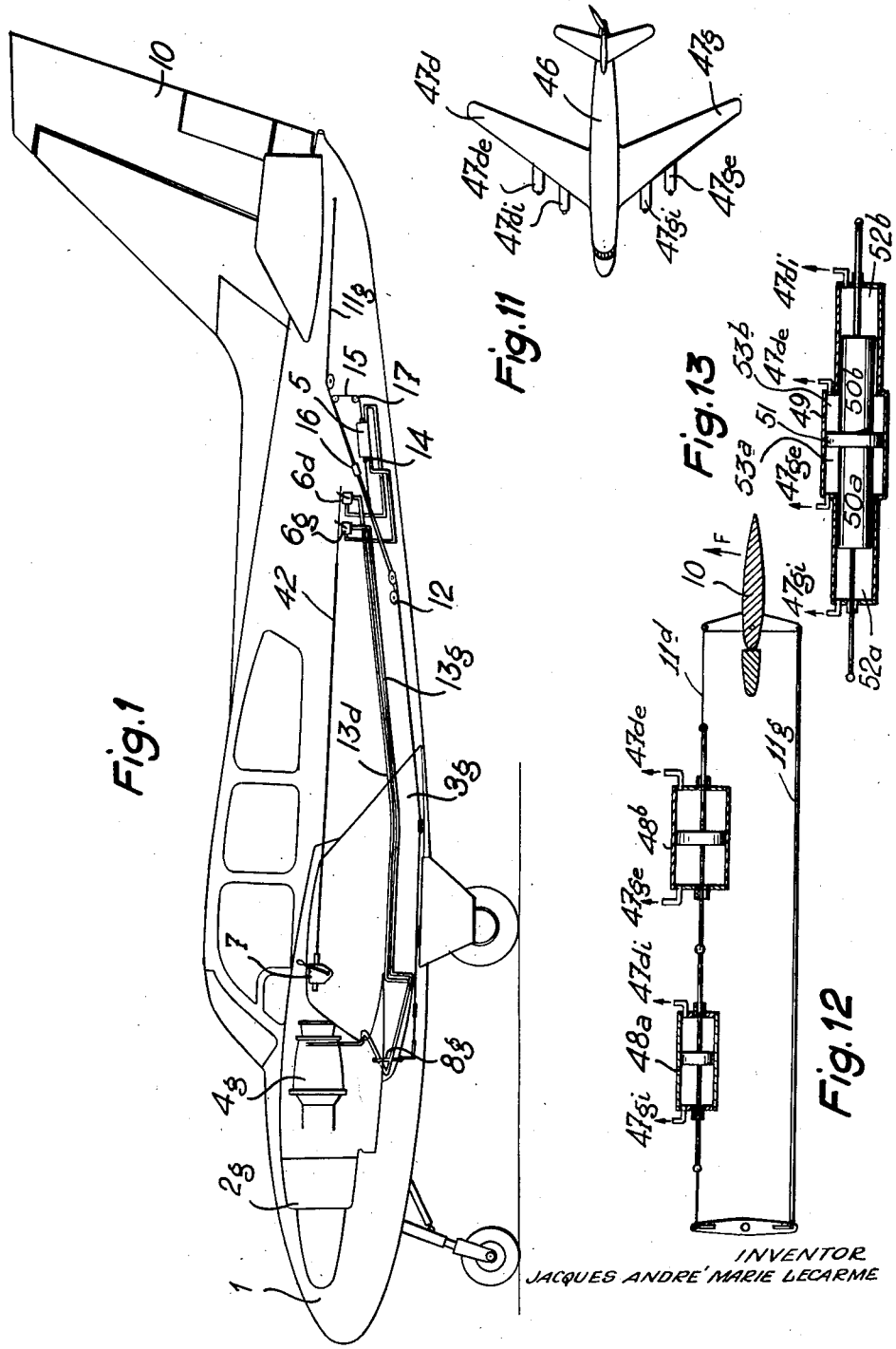

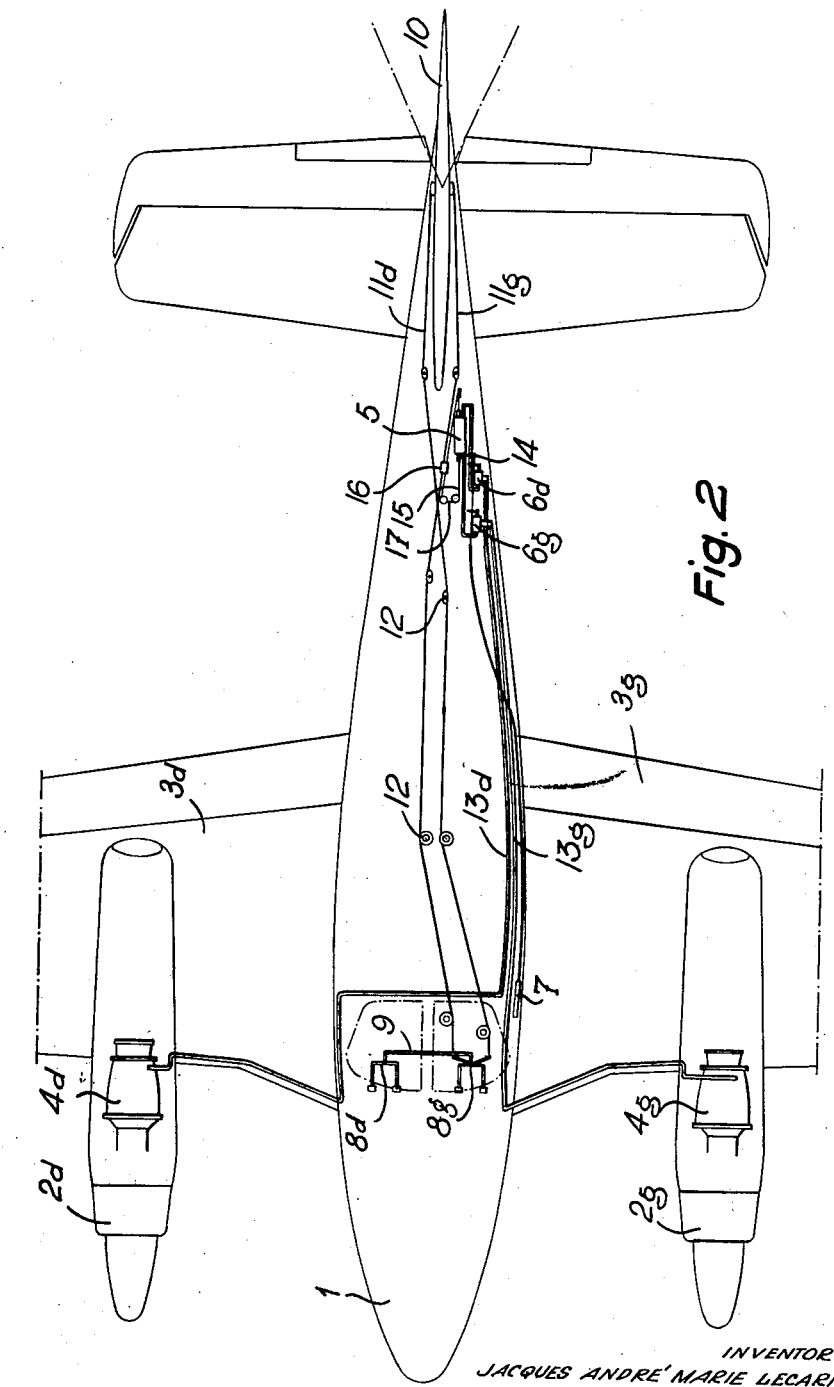

Dec. 8, 1964 J. A. M. LECARME 3,160,367
AUTOMATIC AIRCRAFT RUDDER TRIMMER IN THE
EVENT OF FAILURE OF ONE TURBINE
ENGINE DRIVING SAID AIRCRAFT
Filed Dec. 31, 1962 4 Sheets-Sheet 4
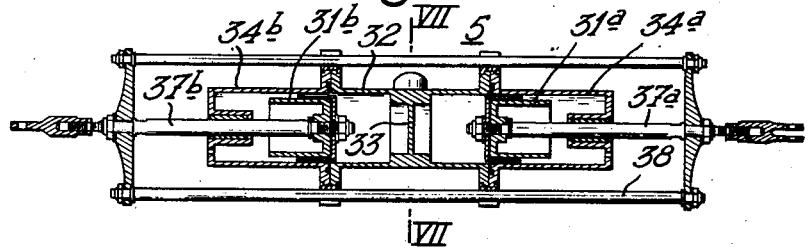
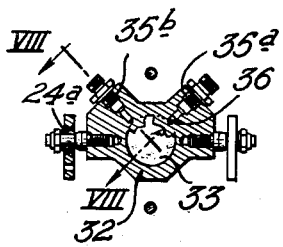
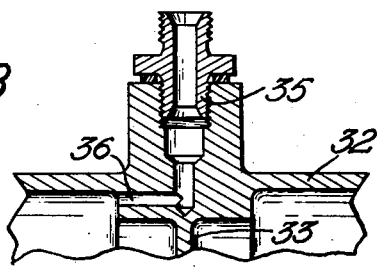
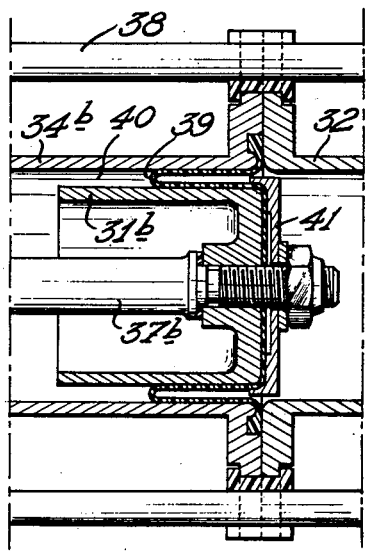

3,160,367
AUTOMATIC AIRCRAFT RUDDER TRIMMER IN THE EVENT OF FAILURE OF ONE TURBINE ENGINE DRIVING SAID AIRCRAFT
Jacques André Marie Lecarme, Paris, France, assignor to Société Française d'Entretien et de Reparation de Materiel Aeronautique (S.F.E.R.M.A.), Suresnes, France
Filed Dec. 31, 1962, Ser. No. 248,636
Claims priority, application France, July 4, 1962, 902,882, Patent 1,344,276
9 Claims. (Cl. 244—76)

On an aircraft powered by turbine engines, whether by direct jet propulsion of the single or by-pass flow type, or indirect propulsion by a propeller, the thrust or traction delivered by each turbine engine, for a given flying speed, is a substantially linear function of the pressure in the combustion chamber or chambers of that engine.

In addition, the force which the pilot must apply to the rudder in order to hold the aircraft in straight flight at a given speed is likewise in substantially linear relationship with the difference between the moments of the thrusts exerted by the engines disposed on the port and starboard sides of the aircraft, respectively.

Taking due cognizance of these data, the present invention has for its object to provide an automatic rudder trimmer for an aircraft powered by turbine engines, in the event of failure of one such engine, comprising a mobile apparatus which is sensitive to the compressor outlet pressure differential between the port and starboard powerplants of the aircraft and which is so coupled, directly or otherwise, to the linkage connecting the pilot's control pedals to the rudder that it deflects said rudder, relative to the aircraft, towards that side which is opposite the failing motor.

In the case of an aircraft equipped with a turbine engine on each wing, the said mobile apparatus preferably consists of a piston, of which one face receives the compressor outlet pressure of the engine on one wing, and the other face the compressor outlet pressure of the engine on the other wing, said piston being either of the single type or consisting of two mechanically coupled pistons moving in a centrally partitioned common chamber and defining two elementary chambers respectively connected to the compressor outlets.

In the case of a multi-engine aircraft, the mobile apparatus preferably consists either of series-connected jacks, or of a single jack with stepped piston, said series-connected jacks or single-piston steps being equal in number to the number of pairs of port and starboard engines symmetrically disposed with respect to the longitudinal plane of symmetry of the aircraft and being respectively connected to the compressor outlets of said pairs, and the cross-sections of the jack pistons or the single-piston steps being respectively proportional to the distance of the corresponding pair of engines from said longitudinal plane of symmetry.

In either case, any difference between the thrust exerted by the starboard engine or engines and that exerted by the port engine or engines, tending to cause the aircraft to yaw, results in a counting force being exerted on the rudder control, independently of the degree of rudder deflection.

This force provides a tactile warning to the pilot, and gives him an instantaneous indication, calling for no reasoning on his part, of the side on which an engine has failed and of the sense of the corrective control action required on the rudder-bar. This yaw countering force leaves the pilot complete freedom over flight control, provided the automatic correcting device introduces only a small amount of friction into the control.

The description which follows with reference to the accompanying drawings, which are filled by way of example only and not of limitation, will give a clear understanding of how the invention may be carried into practice and will reveal yet further particularities thereof.

In the drawings:

FIGS. 1 and 2 are respectively side elevation and plan views of a twin-engine aircraft equipped with an automatic rudder trimmer executed in accordance with this invention, the aircraft being assumed to be fully transparent.

FIGS. 3 and 4 are respectively side elevation and plan views, with partial cutaway in the case of FIG. 4, of an automatic correcting jack and its manner of coupling to the rudder control.

FIG. 5 is a view on a larger scale, with partial cutaway, of one of the swivel joints used for mounting the jack of FIGS. 3 and 4.

FIG. 6 is a diametrical sectional view of a possible embodiment of an automatic trimming jack with dual pistons.

FIG. 7 is a sectional view, taken through the line VII—VII of FIG. 6.

FIG. 8 is a larger-scale section taken through the line VIII—VIII of FIG. 7.

FIG. 9 is a fragmentary view on a larger scale of one of the pistons of FIG. 6.

FIG. 10 illustrates the manner of fitting and connecting the three-way cocks supplying the automatic trimming jack, said cocks being represented in the position for which the trimming jack is inoperative.

FIG. 11 is a highly diagrammatic illustration of a four-engine aircraft; and

FIGS. 12 and 13 are schematic illustrations of two possible embodiments of an automatic trimming jack usable on the four-engine aircraft of FIG. 11.

Referring first to FIGS. 1 and 2, the aircraft 1 shown thereon is equipped with two turbine engines 2g, 2d, mounted on the wings 3g, 3d, the compressors of which engines are schematically represented at 4g, 4d.

A jack 5 has its extremities connected to two interconnected three-way cocks 6g, 6d, which are controlled by a lever 7 placed at the pilot's disposal.

In conventional manner, the pedals 8g, 8d, which are interconnected by a rigid rod 9, actuate the rudder 10 through a linkage system consisting of cables 11g, 11d guided by pulleys 12.

Pipes 13, 13g tapped off the output end of the port compressor 4g, and 13d tapped off the output end of the starboard compressor 4d, supply the two chambers of compensating jack 5, said pipes respectively communicating with one face of the piston of said jack 5 through the medium of cocks 6g and 6d.

Piston rod 14, which extends right through the jack 5, is connected at each end to an endless cable 15 which is guided by pulleys 17 and is attached, by means of a clamping plate 16, to that rudder control cable 11g leading up to the rudder 10 which is on the same side as the side on which is mounted, relative to the aircraft fore-and-aft axis, that turbine engine 2g the compressor 4g of which has its output end connected to the jack chamber through which moves that portion of rod 14 which extends from the jack away from the rudder.

FIGS. 3 through 5 illustrate one possible embodiment of jack 5. In this example, the jack consists of two end inserts 18a, 18b, secured by screws 19 to the cylinder casing 20, sealing being ensured by means of O-rings 21. The casing 20 is provided with two aligned central bosses 22a, 22b, which serve to mount it on the supports 23a, 23b rigid with the airframe, through the medium of swivel joints 24 (see FIG. 5). Each end 18 is provided with a union 25a (or 25b) which connects it to the supply line. Piston rod 14a is provided at its extremities with yokes 27, into which engage the end fittings of cable 15, which are provided with safety devices consisting of shear rivets 28 made of Al-Mg alloy, for example.

In order to avoid introducing undue extra frictions into the directional control system during piloting, the sealing of the jack is ensured by a piston 29 of small clearance and leakage, in conjunction with circular discharge grooves 30 similar to labyrinth seals.

An alternative embodiment of jack 5 is shown in FIGS. 7 through 10. As in the preceding method of construction, the jack is hinged, via swivel joints 24a, onto the fuselage walls, but in this case it comprises two pistons 31a, 31b. The cylinder is made up in three sections, namely a central section 32 with a central partition 33 and end sections 34a and 34b. The jack is supplied centrally by means of two taps 35a, 35b level with partition 33 and respectively communicating, on either side of said partition, through ducts 36, with the chambers comprised between the partition and the pistons 31a, 31b. The said pistons, 31a, 31b are interconnected by their rods 37a, 37b and an external frame 38.

The sealing method used for the pistons differs from that employed in the embodiment shown in FIGS. 3 through 5 and consists in this case of an unwinding diaphragm 49 inserted into the clearance 40 defined between the cylinder bore and the cylindrical surface of piston 31a, 31b, said diaphragm being secured to piston rod 37a, 37b by means of a clamping piece 41, and being also gripped between the central section 32 and the corresponding end section 34a, 34b. This ensures minimum friction.

Such minimum friction can also be obtained by means (not shown) such as sealing rings made of fluorosilicate, which material has a low coefficient of friction even at high temperatures (the temperature of the air issuing from the compressors being close to 250° C.). Alternatively, sealing may be achieved by means of metal bellows in place of the pistons.

The device is operated by lever 7 (FIG. 1), which is placed within easy reach of the pilot and which, through a rack and sector mechanism and a remote control 42 consisting, say, of a Bowden-type cable, operates the two three-way cocks 6g and 6d interconnected by an actuating rod 43.

Each cock is connected, firstly, to one of the compressors 4g or 4d through the line 13g or 13d and, secondly, to one of the extremities of jack 5 through a line 44g or 44d. Each cock is also provided with a nozzle 45g or 45d for venting purposes or for interconnecting the two chambers of the jack in order to obtain a balancing position for the piston or pistons.

When the rotation speeds of the engines are identical, the outlet pressures $P_2$ from the respective compressors 4 are equal, so that piston 29 (FIG. 4) or pistons 31 (FIG. 6), acted upon by two equal forces, remain motionless unless the pilot operates the rudder pedals.

The sole purpose of the difference between the diameters of lines 13g, 13d and 44g, 44d, apparent in FIGS. 3 and 10, is to avoid cross-connecting the lines to the three-way cocks and the jacks.

If one of the engines fails, for instance engine 2g, the drop in r.p.m. will cause a corresponding pressure drop on one face of piston 29 or on one of pistons 31a or 31b (supplied by three-way cock 6g), while the other face or the other piston will sustain the outlet pressure from the compressor 4d of the normally running engine 2d, which pressure is transmitted through the three-way cock 6d. The resulting force will tend to deflect the rudder 10 towards the starboard side of the aircraft, namely in the sense required to offset the yawing torque resulting from the failure of engine 2g, which would otherwise tend to turn the aircraft to port. This rudder deflection continues until equality is reached between the forces acting through the control 11g and those resulting from the deflection of rudder 10 (unless the pilot intervenes) into the required position.

At the same time, as indicated precedingly, this force acts as a tactile warning to the pilot, indicating to him instantly the side of the aircraft on which an engine has failed and the sense of the corrective control action to be applied to the rudder-bar.

In addition, the automatic trimmer hereinbefore described overcomes the difficulty experienced in dimensioning control surfaces to ensure effectiveness over a wide speed range; indeed, it is tricky to establish the right compromise between acceptable hinge moments and satisfactory control surface effectiveness at low flying speeds without the risk of dangerous over-compensation at high speeds, or, alternatively, of too much side-slip due to excessive power on the control surface.

The control surface should therefore be trimmed aerodynamically for fairly high flying speeds, so that the automatic correcting device operates for low speeds— which are the most dangerous in the event of engine failure—by introducing a force which the pilot can feel and which operates in the required sense.

The device will therefore be used chiefly during take-off, at which time its utility will be manifest should an engine fail between the safe take-off speed $V_2$ and the minimum control speed $V_{MC}$ in the event of an engine failure. These speeds are defined as follows: $V_{MC}$ is the minimum forward speed when the most critical engine is inoperative, i.e. in the case of wing-mounted engines, that engine which produces the greatest yawing moment and which is therefore farthest from the fore-and-aft axis; $V_2$ is the safe take-off speed and is equal to $1.1 V_{MC}$.

The automatic trimming device according to this invention is referred to in practice by the simplified expression "$V_{MC}$ piston," so chosen because its main component part is a piston and because it is designed to operate without delay before the speed can drop below $V_{MC}$.

Should it be desired to render the device inoperative, during cruising flight for instance, displacement of control lever 7 operates on three-way cocks 6g and 6d in such manner as to cause both chambers of jack 5 to be vented or interconnected through the nozzles 45g and 45d. This being so, piston 29 (or pistons 31a or 31b) being only slaved to motion of the control 11g, has no further effect other than through the friction it engenders.

Lastly, should piston 29, or pistons 31a, 31b, seize up, or should any other reason result in the pedal force exceeding a preset value laid down by regulations (150 kg for instance), at least one of the rivets 28 connecting the cable tensioners 15 to the jack 5 (FIG. 4) would fail and thereby disconnect the latter from the normal directional control systems.

This invention can be extended to cover the case of a multi-engine aircraft such as the four-engine aircraft 46 shown in FIG. 11, the wings 47g and 47d of which respectively mount turbine engines 47gi, 47ge and 47di, 47de.

As is more clearly illustrated in FIG. 12, when this is the case, the single jack utilized for twin-engine aircraft is replaced by two jacks 48a and 48b which are series-connected by joining the two adjacent extremities of their rods and which are shown as being of the same type as that used in FIGS. 3 and 4. Each of these jacks is connected to a pair of port and starboard engines, the inboard pair 47gi, 47di being associated to jack 48a and the outboard pair 47ge, 47de to jack 48b. Jacks 48a and 48b have cross-sections respectively proportional to the asymmetrical moment applied to the aircraft as a result of failure of one of the corresponding engines, the cross-section of the jack 48b connected to the outboard engines being greater than that of the jack 48a connected to the inboard engines.

These jacks are inserted into that portion 11d of the linkage connecting the rudder bar to the rudder 10 which is attached to said rudder on the same side, relative to the aircraft fore-and-aft axis, as that on which are mounted those turbine engines 47di and 47de of which the compressors have their outputs connected to the jack chambers within which travel those portions of the associated rods which project from the jacks towards the rudder. This insertion system utilizes shear pins similar to rivets 28.

In the event of failure of engine 47gi, for example, the operative jack will be jack 48a, and its piston will move leftwards and in so doing will move with it the piston of jack 48b, thereby deflecting rudder 10 in the required sense, shown by the arrow F. If the engine 47ge fails, it is jack 48b which becomes operative and introduces a greater force into the control. Finally, should both engines 47gi and 47ge fail, both jacks will become operative and the force applied to the control will be equal to the sum of the forces delivered by the two jacks.

Reference is now had to FIG. 13, which illustrates another possible embodiment of an automatic trimming jack according to this invention, suitable for use on the four-engine aircraft of FIG. 11. In this particular case, the jack consists of a double-jack 49 comprising three cavities arranged in succession, the central one having a diameter greater than the other two, and a piston having three sections 50a, 50b and 51 which define in said cavities chambers 52a, 52b, 53a and 53b which are connected to the compressor outlets of engines 47gi, 47di, 47ge and 47de respectively. In this particular embodiment, as in the preceding one, piston section 51 has a larger diameter than sections 50a and 50b and its cross-section is proportional to the asymmetrical moment applied to the aircraft when one of the outboard engines fails.

It will of course be understood that many modifications or substitutions of parts can be made to the specific embodiments described, without departing from the scope of the invention as defined in the appended claims. By way of example, in the case of an aircraft powered by more than four engines, say by 2n engines, the layout shown in FIG. 12 would comprise n jacks and that in FIG. 13 a piston with n sections, each jack or each piston section being connected to a pair of port and starboard engines positioned at equal distances from the fore-and-aft axis of the aircraft. Similarly, the jacks of FIGS. 3 and 6 could be connected directly into the control linkage, as shown in FIG. 12, while jacks 48a, 48b and 49 could be connected into the control linkage, by means of an endless cable, as shown in FIGS. 3 and 4.

What I claim is:

1. In an automatic trimming device of the type effecting automatic correction of turning tendencies of a multiple-engine aircraft under asymetric power conditions by applying compensating forces to the rudder of said aircraft, which aircraft is provided with a rudder-bar connected to said rudder through a control linkage and is driven by at least one pair of turbine engines mounted symmetrically with reference to the aircraft longitudinal plane of symmetry and each one of which has a compressor; the improvement which comprises at least one jack casing, at least one piston reciprocally movable in each jack casing, two rods projecting on either side of each jack casing and subjecting to said reciprocating motion, the chambers in each jack casing being arranged in opposite directions relative to the transverse symmetry plane of said jack casing, two pipes respectively tapped off the two compressor outlets of each pair of turbine engines and respectively connected to two opposite chambers of the same casing, means for connecting the two rods of each jack to the control linkage so as to deflect the rudder towards that side which is opposite that on which a failing turbine engine is mounted, a three-way cock having two of its ways connected into each pipe and the third vented, and, for all the pipes, interconnected actuating links for the three-way cocks, a transmission system connected to said links, and an operating lever placed within reach of the aircraft pilot and coupled to said transmission system.

2. An automatic trimming device according to claim 1, wherein the connecting means comprise shear rivets interconnecting a portion of the control linkage and the two rods of each jack casing, said portion of the control linkage leading up to the rudder on the same side as that on which is mounted, relative to the longitudinal plane of symmetry of the aircraft, each turbine engine the compressor outlet of which is connected to a jack casing chamber which co-operates with the rod projecting from the casing in the direction of the rudder.

3. An automatic trimming device according to claim 1, equipped with a single jack casing and wherein said connecting means comprise a cable, end tensioners joining the cable extremities to the two rods projecting on either side of said single jack casing, light alloy shear rivets inserted into said end tensioners, and a device for connecting said cable to that portion of the control linkage which leads up to the rudder on the same side as that on which is mounted, relative to the aircraft longitudinal plane of symmetry, each turbine engine the compressor outlet of which is connected to the jack casing chamber which co-operates with the rod projecting from the casing in a direction opposite to the rudder.

4. An automatic trimming device according to claim 1, wherein each piston is provided with circular discharge grooves as in labyrinth seals, in order to ensure leaktightness.

5. An automatic trimming device according to claim 1, wherein each piston is fitted into the corresponding jack casing with an annular clearance, an unwinding diaphragm being inserted into said clearance and having its extremities secured to the jack casing and to the piston, respectively, so as to ensure piston tightness.

6. An automatic trimming device, in the event of failure of a turbine engine, for the rudder of an aircraft which has a rudder-bar connected to said rudder through a control linkage and which is powered by two turbine engines mounted symmetrically relative to the aircraft longitudinal plane of symmetry, and each one of which has a compressor, comprising, in combination, a jack casing, swivel joint means for mounting said casing on the aircraft, a piston reciprocating within said casing and defining two chambers therein, a rod rigid with said piston and projecting on each side of said casing, pipes for connecting respectively each of the two chambers in said casing to the compressor outlets of said turbine engines, means controlled by the pilot for rendering the trimming device inoperative, means for connecting the extremities of said rod to the control linkage joining the rudder-bar to the rudder in order to deflect said rudder away from the side of the aircraft on which a failing engine is mounted, and means for limiting the force to be exerted on the rudder-bar in the event of a malfunction of said device.

7. An automatic trimming device, in the event of failure of a turbine engine, for the rudder of an aircraft which has a rudder-bar connected to said rudder through a control linkage and which is powered by two turbine engines mounted symmetrically relative to the aircraft longitudinal plane of symmetry and each one of which has a compressor, comprising, in combination, a jack casing having a central partition provided with radially disposed pipe take-off points connected respectively through longitudinal ducts in said partition to the two chambers defined by said central partition, swivel joint means for mounting said casing on the aircraft, two reciprocating pistons respectively cooperating with said two chambers, a rod rigid with each piston and projecting from said casing on that side of the associated piston which is remote from said central partition, a frame guided by said casing and interconnecting said two rods, two pipes for respectively connecting the two take-off points of the said central partition to the compressor outlets of said turbine engines, means controlled by the pilot for rendering the trimming device inoperative, means for connecting the extremities of said rods to the linkage connecting the rudder-bar to the rudder in order to deflect said rudder away from the side of the aircraft on which a failing engine is mounted, and means for limiting the force to be exerted on the rudder-bar in the event of a malfunction of said device.

8. An automatic trimming device, in the event of failure of a turbine engine, for the rudder of an aircraft which has a rudder-bar connected to said rudder through a control linkage and which is powered by a plurality of turbine engines mounted in pairs symmetrically with reference to the aircraft longitudinal plane of symmetry at different distances therefrom from one pair to another and each one of which has a compressor, comprising, in combination, a single jack casing consisting of a succession of cylindrical capacities of increasing diameter from the ends of the casing toward the centre thereof; a single piston provided with stepped sections having diameters equal to the inner diameters of said cylindrical capacities within which they travel while defining in said jack casing chambers which in the inoperative configuration are symmetrically disposed relative to the transverse symmetry plane of said casing; two rods respectively rigid with the ends of said stepped pistons and projecting on each side of said casing; pipes respectively connecting those chambers of said jack casing which are located on a same side of said transverse symmetry plane to the compressor outlets of the turbine engines mounted on a same side of the aircraft longitudinal plane of symmetry, the cross-sections of the piston steps and the cylindrical capacities of said jack casing being respectively proportional to the distances of the corresponding pairs of turbine engines from said longitudinal plane of symmetry; means controlled by the pilot for rendering the trimming device inoperative; means for connecting the extremities of said rods to the linkage joining the rudder-bar to the rudder in order to deflect said rudder away from the side of the aircraft on which a failing engine is mounted; and means for limiting the force to be exerted on the rudder-bar in the event of a malfunction of said device.

9. An automatic trimming device, in the event of failure of a turbine engine, for the rudder of an aircraft which has a rudder-bar connected to said rudder through a control linkage and which is powered by a plurality of turbine engines mounted in symmetrical pairs relative to the aircraft longitudinal plane of symmetry, at different distances therefrom from one pair to another and each one of which has a compressor, comprising, in combination, a plurality of jack casings the number of which is equal to that of the engine pairs; in each casing a piston which defines therein two chambers, and two rods rigid with the respective faces of said piston and projecting from each side of said casing, said jack casings being series-connected by interconnection of their adjacent rods; pipes for respectively connecting the two chambers of each jack casing to the compressor outlets of the two turbine engines of a same pair, the cross-sections of the pistons of these jacks being respectively proportional to the distances of the different pairs of engines from the aircraft longitudinal plane of symmetry; means controlled by the pilot for rendering the trimming device inoperative; means for connecting the extremities of the rods of said series-connected jacks to the control linkage joining the rudder-bar to the rudder so as to deflect said rudder away from that side of the aircraft on which a failing engine is mounted; and means for limiting the force to be exerted on the rudder-bar in the event of a malfunction of said device.

References Cited in the file of this patent

UNITED STATES PATENTS 2,597,020    Nissen _____ May 20, 1952

FOREIGN PATENTS 641,324    Germany _____ Jan. 27, 1937